United States Patent [19]

Matthysse et al.

[11] Patent Number: 5,131,702
[45] Date of Patent: Jul. 21, 1992

[54] AUTOMOTIVE BUMPER AND ITS MANUFACTURING PROCESS

[75] Inventors: Ronald J. Matthysse, Hudsonville; Brent D. Miedema, Allendale; Dan A. Kleymeer, Grand Haven; David W. Pawlak, Muskegon, all of Mich.

[73] Assignee: Ardyne, Inc., Grand Haven, Mich.

[21] Appl. No.: 224,616

[22] Filed: Jul. 25, 1988

[51] Int. Cl.⁵ .............................. B60R 19/04
[52] U.S. Cl. ........................ 293/121; 293/120
[58] Field of Search .............. 293/102, 120, 121; 264/257, 46.6, 46.7, 261; 204/20, 30, 32.1, 34, 41

[56] References Cited

U.S. PATENT DOCUMENTS

| | | | |
|---|---|---|---|
| 4,002,595 | 1/1977 | Adelman | 204/30 |
| 4,116,480 | 9/1978 | Crestetto | 293/102 |
| 4,193,621 | 3/1980 | Peichl et al. | 293/142 |
| 4,272,115 | 6/1981 | Stock | 293/155 |
| 4,339,144 | 7/1982 | Nagasaka | 293/120 |
| 4,545,105 | 10/1985 | Kowalsky | 29/469.5 |
| 4,552,626 | 11/1985 | Stevenson | 204/30 |
| 4,563,399 | 1/1986 | Wright, Jr. | 204/41 |
| 4,569,865 | 2/1986 | Placek | 428/31 |
| 4,573,603 | 3/1986 | Starling et al. | 220/69 |
| 4,657,717 | 4/1987 | Cattanach et al. | 264/10.2 |
| 4,731,166 | 3/1988 | Jones | 204/34 |
| 4,762,584 | 8/1988 | Andreasen et al. | 264/261 |
| 4,764,260 | 8/1988 | Gay et al. | 204/34 |

FOREIGN PATENT DOCUMENTS 3216717 9/1988 Japan .................. 293/120

*Primary Examiner*—Andres Kashnikow
*Assistant Examiner*—Christopher G. Trainor

[57] ABSTRACT

A method is disclosed for the chrome plating of a stainless steel automotive bumper having a plastic structural backing. The backing is submersible within the acid treating baths used to chrome plate the outer surface of the stainless steel portion of the bumper.

1 Claim, 1 Drawing Sheet

AUTOMOTIVE BUMPER AND ITS MANUFACTURING PROCESS

BACKGROUND

1. Field of the Invention

The present invention relates to an automotive bumper and its manufacturing process.

2. Description of Prior Art

An automotive bumper is the piece attached to the front and rear of a car to serve as an energy dissipation device in a collision, thereby protecting the auto body and the driver. Particularly in the case of a passenger car, the aesthetic requirement of the bumper, which appears on the outside of the vehicle, is stressed in addition to the above collision-energy management requirement.

Conventional automotive bumpers can be breadly classified into:

1) Energy absorbing types such as:
   (a) a stable-type consisting of a steel bumper plus a shock absorber (Menasco type), or
   (b) a polyurethane bumper, or
   (c) a non-stable type consisting of a bumper made entirely of fiber reinforced plastics (FRP) which can absorb the energy of destruction itself.
2) Hybrid composite bumpers having a metal shell and a plastic backing, such as a foam backing or a FRP backing, or
3) Ordinary types such as a steel bumper securely fastened to the auto chassis.

The last mentioned commonly-used steel bumper has drawbacks in that it is heavy, thereby increasing the vehicle inertia. Moreover, since it is fitted at the front and rear ends of a vehicle, it is unfavorable for controlling longitudinal vibrations of a vehicle, i.e., so-called pitching. By contrast, the polyurethane bumper is light and can restore itself after a collision, but it cannot be given a metallic luster and it is thus limited in design versatility. Meanwhile, the bumper made entirely of FRP, which is usually metallic-coated or metallized for aesthetic reasons, defies a treatment to give it a durable, metallic luster.

The hybrid composite bumper having a metal shell and plastic backing previously lacked sufficient adhesion between the metal shell and plastic backing to allow acceptable joining of these elements at their interface. Good adhesion between the two elements provides a pleasant feel of structural integrity, thereby enhancing the commercial value of the bumper and contributing to its rigidity as well as reducing its weight. Thus, good adhesion has been one of the important requirements in a bumper of this kind.

This problem of adhesion has been addressed in three U.S. Pat. Nos. 4,545,105, 4,569,865 and 4,339,144, which disclose methods for bonding a metal member to a foamed or fiber reinforced plastic backing so as to provide an automotive bumper consisting of a firmly integrated structure of metal and plastic. Such bumpers now exhibit metallic luster and good appearance and also are considerably lighter than their solid steel counterparts.

None of these patents teach plating of the outer surface of the metal shell to further enhance the appearance of the bumper, before or after attachment of the plastic backing. Chrome plating the metal shell prior to affixing the plastic backing would not be advisable due to damage to the plating during the insertion and removal of the metal shell from the mold used to bond the shell to the backing. Additionally, removal of any resin or foam that has flowed around the edges of the metal shell during the molding process would probably be done by mechanical or chemical methods which would further damage any chrome plating.

Furthermore, it would not be economically desirable to invest the cost of chrome plating in a metal shell, prior to its being bonded to a plastic backing, if the entire bumper assembly were subsequently discarded due to inadequate bonding between the metal shell and the backing.

A method and apparatus thereby need be developed that takes advantage of the light weight of a hybrid composite bumper, wherein the process of fabrication allows plating of the outer surface of the metal shell.

SUMMARY OF THE INVENTION

The primary object of the present invention is to describe a process wherein the outer metallic surface of a hybrid composite bumper is chrome plated to enhance its aesthetic and therefore commercial value.

In such a process, a metal shell is operatively engaged, or bonded, within a mold to a plastic backing, thereby forming a bumper assembly. The bumper assembly is then removed from the mold. The outer surface of the metal shell and the outer surface of the plastic backing are then exposed to all of the caustic chemicals encountered in the chrome plating process. The outer surface of the metal shell is thereby chrome plated while the plastic backing remains operatively engaged to the metal shell.

It has surprisingly been found that the plastic backing may be submerged within all of the caustic chrome plating solutions without apparent damage.

Only after the plastic backing and metal shell have been verified as having been successfully bonded to one another is the chrome plating process begun. Unbonded bumper assemblies are discarded prior to reaching the expensive chrome plating process.

Another advantage is that the bumper assembly has not been chrome plated prior to removal of the bumper assembly from the mold such that no chrome plating exists on the bumper assembly to be damaged during these operations.

Additionally, thin gauge metal may be used for the metal shell with significant weight savings. Use of the thin gauge metal also insures that the metal shell will consistently take the shape of the metal shell stamping die, and allows the use of lighter and therefore less expensive stamping apparatus.

Still another object of the present invention is to describe a process for manufacturing an automotive bumper consisting of an integrated structure of chrome plated steel with a fiber-reinforced plastic backing.

It is a feature of the present invention to conduct the plating of the metal shell while the plastic backing is attached to the inner surface of the shell.

These and other features, objects, and advantages of the present invention will become apparent from the following detailed description, wherein reference is made to the Figures in the accompanying drawing.

IN THE DRAWINGS

DESCRIPTION OF THE PREFERRED EMBODIMENT

Figure 1:
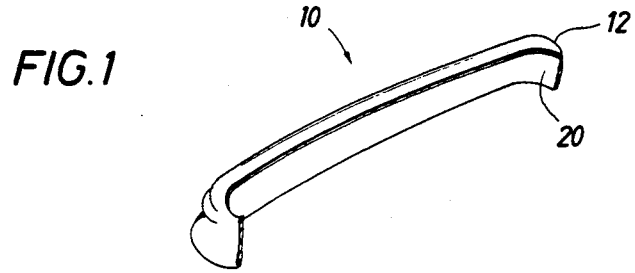
FIG. 1 is a isometric view of a bumper having a plated outer metal shell and an inner part comprising fiber reinforced plastic.
Figure 2:
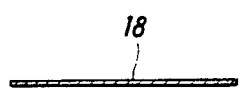
FIGS. 2 and 3 show the formation of the metal shell.
Figure 3:
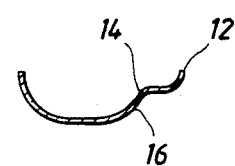

Referring now to FIG. 1, the lightweight corrosion resistant rigid bumper 10 for an automotive vehicle is shown. The bumper 10 can be seen to have a metal shell 12 of a first thickness and an inner and an outer surface 14, 16 respectively, (FIG. 3). Metal shell 12 may be formed by stamping or otherwise forming plate 18 (FIG. 2) as is well known to the art.

Figure 4:
FIGS. 4 and 5 show the formation of a preform which forms a portion of the inner part.
Figure 5:
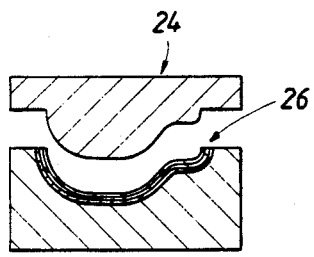
Figure 6:
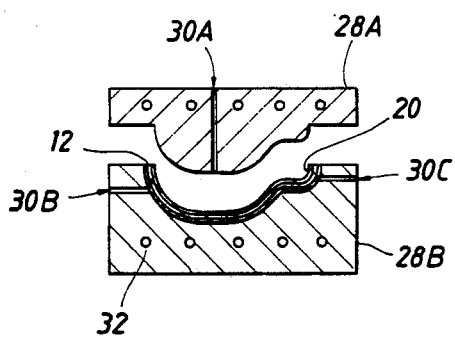
FIG. 6 shows a process wherein the metal shell is bonded to the inner part.

Bumper 10 also includes inner part 20 (FIG. 6) in a preferred embodiment comprising a preformed-fiber reinforced plastic material. The preformed fibers are assembled by lamination of layers 22 (FIG. 4) of fiberglass fabric into preform 26 (FIG. 5). It should be well recognized that the layers may comprise various configurations of a variety of fibrous reinforcement fabrics, such as carbon, boron, or Kevlar fiberglass, wherein the fabric(s) can consist of chopped fibers, woven fibers, directional or random fibers, etc. of various sizes and weights. In a preferred embodiment four layers of no. 2215, 2415 woven/chopped fiberglass from PPG INC. comprise the laminated layers 22.

As shown in FIG. 5, these laminated layers 22 are heated, placed within a perforated mold 24, pressed into a desired shape so as to form the preform 26, and allowed to cool as is well known to the art. The perforations in the mold allow gases to be ducted away from the layers 22 so the binders on the layers polymerize.

The preform 26 is then placed between mold sections 28A, 28B, on the inner surface 14 of metal shell 12. A hardenable thermoset (or thermoplastic) resin is then introduced through resin injection ports 30A, 30B, and 30C in an injection molding process so as to operatively engage the inner part 20, now comprising the preform wetted by the hardenable resin, to the inner surface 14. Internal heaters 32 may be provided in the mold sections 28A, 28B to assist in the molding process.

Figure 7:
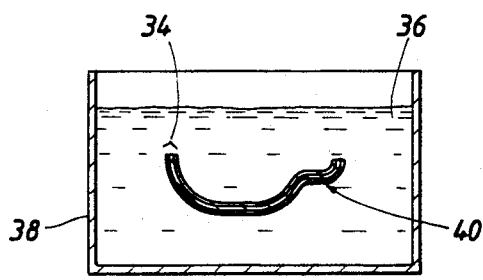
FIG. 7 shows the bumper assembly submerged in plating fluids contained within a tank.

A bumper assembly 34 (FIG. 7) formed by the inner part 20 and metal shell 12 is thereafter submerged in a succession of plating fluids 36 within tank 38 so as to deposit layer means 40 on the outer surface 16 of the metal shell after the preformed inner part 20 is operatively engaged to the metal shell 12.

An obvious advantage of the present invention is that improperly bonded bumper assemblies 34 may be discarded prior to their entrance into the expensive plating process.

It has been quite unexpectedly found that the inner part 20 may be subjected to the plating fluids, including strong acids, without apparent deterioration or loss of physical properties. Additionally, by proper selection of the resin and laminated layers 22 used to from the inner part 20, the permeability of the inner part may be minimized such that absorption of the plating acids is minimized.

In a preferred embodiment the thickness of the metal shell 12 is between 20 to 30 mils thick. For economic reasons 20 mils is optimum but stamping may dictate a 30 mils thickness depending on the shape. The ratio of thickness of the layer means to the metal shell is selected to manage impact energy and in preferred embodiments of the invention would be 9:1 for a metal thickness of 0.020 approximately 3:1 for a metal thickness of 0.030.

A material comprising the metal shell may be selected from the group consisting of stainless steel, mild steel, and aluminum, though in a preferred embodiment the metal shell comprises 301 stainless steel available from Coshocton, Inc.

The preformed-fiber reinforced plastic material includes in a preferred embodiment preformed fibers dimensionally stabilized by a hardened SPECTRIM ® MM383 polyisocyanurate polymer, available from Dow Chemical Company. It should be well recognized that many other polymers may be used to achieve the same mechanical bonding effect as well as the same chemical resistance to the plating acids inherent with use of this particular resin, such as polycarbonate and epoxy resins.

In a preferred embodiment, the layer means 40 such as the chrome plating system will have a thickness in the range of from 0.0010 to 0.0020 inches, though it should be well recognized that many other plating thicknesses may be used.

In operation, the metal shell and preformed inner part are provided and thereafter operatively engaged within mold 28A, 28B as discussed previously, thereby forming the bumper assembly 34 which is removed from the mold. The layer means 40 is then formed on the outer surface of the metal shell of the bumper assembly while the preformed inner part remains operatively engaged to the metal shell, as described below.

The step of operatively engaging the preformed inner part to the metal shell is accomplished by injecting the hardenable resin into the mold throughout at least a portion of the inner part so as to wet the preformed fibers and bond at least a portion of the fibers to the inner surface 14 of the shell 12. The metal shell may be preheated prior to being placed within the mold 28A, 28B.

To improve the bond between the inner part and the shell, the inner surface of the shell may be primed prior to being placed within the mold by first wiping the inner surface of the shell with acetone or suitable degreasing solvent to degrease the inner surface and thereafter to spray the inner surface with an adhesive primer in a preferred embodiment comprising Lord Chemloc 210 ( TM ). It should be well recognized that many other priming and/or adhesive materials may also be used to accomplish the same mechanical result.

Different layer means 40 may be plated on the outer surface of the metal shell to enhance the visual appearance of the surface, though in a preferred embodiment, the layer means comprise the series of plated layers necessary to "chrome plate" the outer surface of the metal shell. The material of the metal shell may comprise steel, mild steel, stainless steel or aluminum, though in a preferred embodiment the material will comprise 301 stainless steel.

In the typical chrome plating process, the bumper assembly 34 is immersed and cleaned to remove surface oils and the outer surface is thereafter electrolytically conditioned to remove insoluble soils and smut. It is also common practice to buff the steel prior to plating. The surface is thereafter chemically motivated by an acid activator by removing metal oxides so that the surface can subsequently accept electrolytic deposits.

A modified nickel noble corrosion barrier is then deposited on the stainless steel substrate of the outer surface, and a bright nickel leveling layer is thereafter deposited on the modified nickel corrosion barrier. A micro-porous nickel system is then deposited on the brigh nickel leveling layer, the microporous nickel system having a minimum pore count of 64,000 pores/sq in. A layer of chromium alloy is thereafter deposited on the microporous nickel system. Such a process is commercially available under the trade name Udylite (TM) Nicrolyte (TM) S Process, which allows adherent deposition of nickel and chromium on stainless steel. The Nicrolytes S Process was developed specifically for thin-gauged exterior stainless steel automotive trim.

It should be well recognized that many other chrome plating processes may be used to accomplish the same result.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations the scope of the invention.

We claim as our invention:

1. A method for the manufacture of a light weight, corrosion resistant, plated rigid bumper for an automotive vehicle wherein said bumper includes:
   a metal shell having a first thickness and an inner surface and an outer surface,
   a preformed non-platable inner part comprising a preformed plastic material operatively engageable to said metal shell inner surface, and
   layer means having a second thickness smaller than said metal shell first thickness; said method comprising the steps of:
   providing said metal shell
   and said preformed non-platable inner part,
   operatively engaging said preformed non-platable inner part to a portion of the inner surface of said metal shell, thereby forming a bumper assembly, and
   plating said layer means on the outer surface of said metal shell of said bumper assembly while said preformed inner part remains operatively engaged to a portion of the inner surface of said metal shell.

* * * * *